Patented Sept. 16, 1952

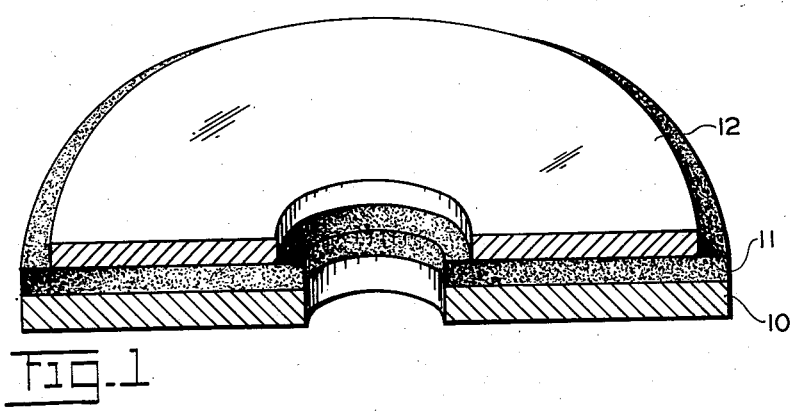

2,610,386

UNITED STATES PATENT OFFICE 2,610,386

SEMICONDUCTIVE CELL

Otto Saslaw, Red Bank, N. J., assignor to Vickers Incorporated, Detroit, Mich., a corporation of Michigan Application July 28, 1949, Serial No. 107,341

7 Claims. (Cl. 29—25.3)

This invention relates to semi-conductive cells and to methods of making them.

Selenium cells for use as rectifiers or photocells usually comprise a thin layer of crystalline selenium on a suitable base or carrier plate of nickel-coated aluminum or any conducting material which will not react unfavorably with selenium, and a counterelectrode of metal contacting the selenium surface. In the common method of manufacturing selenium cells, an adherent layer of amorphous selenium is first applied to the base plate by melting selenium thereon or condensing selenium vapor thereon or by subjecting a layer of powdered selenium on the plate to heat and pressure. The coated plate is then given a suitable annealing or heat treatment to change the selenium layer from its relatively non-conductive, amorphous state to the relatively conducting, crystalline form. This heat treatment may be in two stages, one under mechanical pressure and heat ranging from 100° C. to 120° C. during which stage the selenium is softened and smoothed out and is partly changed to the crystalline state. During the second stage, the plate is subjected to the usual treatment at a temperature slightly below the melting point of selenium, for example, at from 200° C. to 216° C., for a time sufficient to develop the crystal formation of the selenium. After the heat treatment, the selenium surface may be coated with a suitable lacquer or it may be exposed to selenium dioxide vapor to improve the rectifying junction characteristics. The last mentioned step may be omitted if desired.

The cell is structurally completed by applying to the selenium surface the counterelectrode, which may be formed from a low melting point metal, for example, the fusible eutectic alloy of bismuth, tin, and cadmium with a melting point of 103° C. known as "Alloy 103." The term "metal," as used throughout the specification, includes elemental metals and alloys. The counter-electrode may be applied by spraying the metal upon the surface of the selenium.

After the cell has been structurally completed, it is subjected to what is known as "electroforming" or just "forming" to increase the value of the rectification ratio by increasing the reverse resistance. The cell is "formed" by passing current through the cell in the high resistance or reverse direction. Direct current, pulsed direct current, or alternating current may be used in the forming step, and a determinant of the current value is the contact area at the interface of the selenium and the counterelectrode. During the forming, the voltage is gradually increased to the neighborhood of 25 volts as the reverse resistance increases. A major limitation of the allowable forming current and voltage is the permissible heating of the cell which in turn is limited to a great extent by the melting point of the counter-electrode. If the heat generated during forming is above the melting point of the counterelectrode, the metal of which it is formed will flow and run off the selenium surface rendering the cell useless either by virtue of a short circuit between the counterelectrode and the base plate or because of a defective counterelectrode. A plate or cell ruined in the above manner is commonly referred to as a "melt."

Because of the above discussed temperature limitation imposed by the melting point of the metal, the "forming" of the cell requires an extended time period at comparatively low voltages. Even after the forming voltage and current are adjusted to provide safe heat dissipation, concentrated eruptions in the selenium at the interface of the selenium and the counterelectrode may cause an accidental overload resulting in excessive heat and ruination of the cell by the melting of the counterelectrode.

Since the melting point of the metal is a major limitation on the forming voltage and consequent temperature, it would seem desirable to use a higher melting point metal. However, it has been found that the application of a high melt metal directly to the selenium surface after the annealing stage is for some reason detrimental and results in a cell with unacceptable electrical characteristics.

The invention herein permits accelerated forming at relatively high voltages and consequent temperatures, reduces the loss due to "melts," and provides a more fully formed cell with improved reverse characteristics that will operate at relatively high rectification voltages.

These improvements in manufacture and product are obtained by an improvement in the counter-electrode and its formation. After the selenium coating applied to the base plate has been processed to convert it from the amorphous to the crystalline state, and an auxiliary surface treatment, if any, has been applied to the selenium surface, a layer of low melting point metal such as "Alloy 103" is first sprayed onto the selenium surface. Next, a metal with a relatively high melting point is sprayed on the layer of low "melt" material. The cell is then "formed" at relatively high voltages and power dissipation to generate heat above the melting point of the low melt metal but below the melting point of the high melt metal, and thus cause the first metal to fuse into the second. The immediate purpose and effect of this is to provide a high melt backing which will remain substantially firm at high forming and operating voltages and which cause relatively high temperature rise, and will thereby hold the low melt metal on the selenium regardless of the state of fusion or flow of the low melt metal.

It is therefore an object of this invention to provide a new and improved semi-conductive cell and a method for making it.

A further object of the invention is to provide a new and improved counterelectrode for a semi-conductive cell and methods for making it.

Further objects and advantages of the present invention will be apparent from the following description, reference being had to the accompanying drawing wherein a preferred form of the present invention is clearly shown.

In the drawing:

Figure 1 is a view of a semi-conductive cell partly in cross section to illustrate features of the invention.

Figure 2 is a chart indicating the steps of forming a selenium cell as disclosed herein.

Selenium cells are widely used commercially, and for that reason the invention herein is described with selenium cells as examples, although the invention may be practiced in connection with semi-conductive cells utilizing other analogous semi-conductive materials with due consideration being given by those skilled in the art to characteristics peculiar to the particular semi-conductive material used.

In a preferred form of the invention, a surface of a suitable base or carrier plate 10 (Figure 1) is coated with a semi-conductor 11, for example, selenium. The base may be made of any of the many electrical conductors known in the art to be suitable for semi-conductor cell construction, for example, nickel, steel, aluminum, nickeled steel, nickeled aluminum, or any metal or alloy to which the semi-conductor will adhere but which will not react unfavorably with the semi-conductor. The selenium is then converted from its relatively non-conducting, amorphous state to its relatively conducting, crystalline state by a suitable heat treatment after which the selenium surface may be treated by applying lacquer to the selenium surface or by condensing selenium dioxide vapor on the surface of the selenium. There are many other known treatments for the selenium surface which may be used before the counterelectrode is formed. However, as hereinbefore stated, the auxiliary surface treatments of the crystalline selenium may be omitted if desired. The counterelectrode 12 is formed by applying to the selenium surface, a first coat of low melt metal and then applying a second coat of high melt metal over the first metallic coat. The application of the first and second coats may be performed by any suitable method, preferably by spraying.

The first metal may have a melting point of 111° C. or lower, and the melting point of the second metal should be higher than that of the first metal and lower than the melting point of selenium, 217° C. Metals having a melting point below 65° C. may be used for the first coat but they are not generally practicable. Considering that normal forming temperatures heretofore used in electroforming selenium cells range between 70° C. and 100° C., a preferred first metal coat would be one having a melting point around 100° C., for example, the "Alloy 103." The direct purpose of the second metal coat being to restrain the first metal coat from freely running off the selenium surface when it is plastic or in a state of flow due to high forming temperatures or temporary overload when forming at lower temperatures, the metal used for the second coat should be one having a higher melting point than the metal of the first coat, excellent results being had with one having a melting point of about 180° C., for example, one binary eutectic phase of tin and cadium (68 parts Sn+32 parts Cd). Strictly speaking, the invention is practiced in any case where the second metal has a higher melting point than the first metal regardless of the degree of diversity of the melting points. The wider the spread between the melting points of the first and second metallic coats, the greater the range of temperature change during which the lower melt coat will be restrained from flowing off the selenium surface.

After the application of the second metal coat, the cell is "formed" by passing a current through the cell in the high resistance or what is commonly known as the reverse direction. During the forming, the voltage is increased to such a degree that the heat generated in the cell will be below the melting point of the second metal and above the melting point of the first metal, thus permitting the first metal to fuse into the second metal, without, however, causing the second metal to melt and forcing the composite counterelectrode to run off the selenium surface.

It will be appreciated that the composite counterelectrode formed from the two metals will not be homogeneous in structure. Looking at a cross section of the composite counterelectrode, the surface adjacent the selenium will have an alloy structure having a melting point the same or slightly higher than that of the first or low melt metal. In cross section, from this surface to the opposite or outer surface of the electrode, the alloy structure will have graduated melting point values ranging from or near the melting point of the first metal to that of the second metal.

The backing formed by the second metal not only permits forming at higher voltages and consequent greater dissipation of power, but also allows the finished cell to handle relatively high voltages in actual use. For example, such a finished cell used as a rectifier can handle as high as 75 volts which is substantially higher than the rectification voltages of rectifiers made by ordinary methods.

Following are lists of suitable alloys for the first and second metals:

| Component Metals | Suitable Alloys for First Metallic Application (Parts by Weight) | | | | | | |
|---|---|---|---|---|---|---|---|
| Bi | 50 | 52 | 50 | 53 | 54 | 48 | 40 |
| Sn | 12.5 | | 20 | 15 | 26 | 14.5 | 20 |
| Cd | 12.5 | 8 | | | 20 | | |
| Pb | 25 | 40 | 30 | 32 | | 28.5 | 40 |
| Sb | | | | | | 9 | |
| M. P. ° C | 65.5 | 91.5 | 92 | 96 | 103 | 105 | 111 |

| Component Metals | Suitable Alloys for Second Metallic Application (Parts by Weight) | | | |
|---|---|---|---|---|
| Bi | 57 | 51.2 | 60 | |
| Sn | 43 | | | 68 |
| Cd | | 18.2 | 40 | 32 |
| Pb | | 30.6 | | |
| M. P. ° C | 138 | 142 | 144 | 180 |

From an inspection of the lists of suggested alloys, it will be apparent that any of the lower melt alloys of either list could be used as the first metal, and any of the higher melt alloys of the same list could be used as the second metal and still remain within the purview of the invention herein. It will be appreciated that the possible metals and combinations are not confined to those suggested herein. Alloys with melting points not appearing in the enumerated examples may be obtained by varying the portions of the components of any one of the alloys listed. Some of the alloys listed are the eutectics, and it is well known that any variation in the proportion of ingredients from that in a eutectic will result in an alloy having a higher melting point.

Cells made in accordance with the invention herein can be formed faster at higher voltages and will operate at higher voltages because of the substantially higher temperature limitations permitted, and result in a cell with improved electrical characteristics, that is, a better barrier layer, a higher reverse resistance, and an improved rectification ratio.

While the form of embodiment of the invention as herein disclosed constitutes a preferred form, it is to be understood that other forms might be adopted, all coming within the scope of the claims which follow.

What is claimed is as follows:

1. A method of making a selenium cell comprising the steps of applying an adherent layer of amorphous selenium to a conductive base, converting the amorphous selenium to crystalline selenium, applying a layer of low melt metal on the surface of said selenium, applying a layer of high melt metal over the layer of low melt metal, and electroforming said cell at power dissipation values sufficient to generate a temperature above the melting point of the low melt metal and below the melting point of the high melt metal, thus to fuse the low melt metal into the high melt metal.

2. A method of making a selenium cell comprising the steps of preparing a layer of selenium on a base, applying a layer of low melt metal on the surface of the selenium, applying a layer of high melt metal over the low melt metal, and electroforming said cell at suitable currents and voltages to generate heat in such cell with a temperature higher than the melting point of the low melt metal and lower than the melting point of the high melt metal.

3. A method of making a selenium cell comprising the steps of applying an adherent layer of amorphous selenium to a conductive base, converting the amorphous selenium to crystalline selenium by heat treatment, spraying a layer of low melt metal on the surface of said selenium, spraying a layer of high melt metal over the layer of low melt metal, and electroforming said cell at power dissipation values sufficient to generate a temperature above the melting point of the low melt metal and below the melting point of the high melt metal, thereby to fuse the low melt metal into the high melt metal.

4. A method of making a selenium cell comprising the steps of preparing a layer of crystalline selenium on a base, spraying a layer of low melt metal on the surface of the selenium, spraying a layer of high melt metal over the low melt metal, and electroforming said cell at suitable currents and voltages to generate heat in such cell with a temperature higher than the melting point of the low melt metal and lower than the melting point of the high melt metal.

5. A method of forming a counter electrode on the surface of a semi-conductive layer on a base, said method comprising applying a layer of low melt metal on the surface of the semi-conductive layer, applying a layer of high melt metal over the layer of low melt metal, and electroforming the assemblage at suitable currents and voltages to generate temperatures above the melting point of the low melt metal and below the melting point of the high melt metal, thus to fuse the low melt metal into the high melt metal.

6. A method of forming a counterelectrode on the surface of a semi-conductive layer on a base, said method comprising spraying a layer of low melt metal on the surface of the semi-conductive layer, spraying a layer of high melt metal over the layer of low melt metal, and electroforming the assemblage at suitable currents and voltages to generate temperatures above the melting point of the low melt metal and below the melting point of the high melt metal, thus to fuse the low melt metal into the high melt metal.

7. A method of making a rectifier cell comprising the steps of preparing a layer of semi-conductive material on a base, applying a layer of low melt metal on the surface of the material, applying a layer of high melt metal over the low melt metal, and electroforming said cell at suitable currents and voltages to generate heat in such cell with a temperature higher than the melting point of the low melt metal and lower than the melting point of the high melt metal.

OTTO SASLAW.

REFERENCES CITED

The following references are of record in the file of this patent:

UNITED STATES PATENTS

| Number | Name | Date |
| --- | --- | --- |
| 2,096,170 | Geisler et al. | Oct. 19, 1937 |
| 2,137,316 | Van Geel et al. | Nov. 22, 1938 |
| 2,162,487 | Lotz | June 13, 1939 |
| 2,195,245 | Glaser et al. | Mar. 26, 1940 |
| 2,437,336 | Thompson et al. | Mar. 9, 1948 |
| 2,555,247 | Saslaw | May 29, 1951 |

FOREIGN PATENTS

| Number | Country | Date |
| --- | --- | --- |
| 472,961 | Great Britain | Sept. 30, 1937 |